(12) United States Patent
Boneberg et al.

(10) Patent No.: US 6,682,840 B2
(45) Date of Patent: Jan. 27, 2004

(54) FUEL CELL SYSTEM HAVING AN EVAPORATOR

(75) Inventors: Stefan Boneberg, Beuren (DE); Martin Schüssler, Ulm (DE)

(73) Assignee: Ballard Power Systems AG, Kirchheim/Teck-Nabern (DE)

( * ) Notice: Subject to any disclaimer, the term of this patent is extended or adjusted under 35 U.S.C. 154(b) by 187 days.

(21) Appl. No.: 09/728,487

(22) Filed: Dec. 4, 2000

(65) Prior Publication Data
US 2001/0019788 A1 Sep. 6, 2001

(30) Foreign Application Priority Data
Dec. 2, 1999 (DE) .......................... 199 58 179

(51) Int. Cl.⁷ .................................. H01M 8/12
(52) U.S. Cl. ...................... 429/26; 429/12; 429/13; 429/17
(58) Field of Search .................. 429/12, 13, 17, 429/26

(56) References Cited

U.S. PATENT DOCUMENTS

| | | | |
|---|---|---|---|
| 4,746,329 A | 5/1988 | Christner et al. | 48/61 |
| 6,294,149 B1 * | 9/2001 | Autenrieth et al. | 423/648.1 |

FOREIGN PATENT DOCUMENTS

| | | | |
|---|---|---|---|
| DE | 197 20 294 | 12/1998 | |
| DE | 924163 A2 * | 6/1999 | C01B/3/38 |
| EP | 0 206 608 | 12/1986 | |
| EP | 0 878 442 | 11/1998 | |
| EP | 0 920 064 | 6/1999 | |
| WO | WO 97/50140 * | 12/1997 | H01M/8/10 |

* cited by examiner

Primary Examiner—Carol Chaney
Assistant Examiner—Dah-Wei Yuan
(74) Attorney, Agent, or Firm—Crowell & Moring LLP

(57) ABSTRACT

A fuel cell system includes a polymer electrolyte membrane fuel cell unit having a cooling circuit and an evaporator having at least one evaporation chamber for evaporation of a medium in the fuel cell system and at least one heat-transfer chamber which thermally communicates with the evaporation chamber. The heat-transfer chamber is a part of the cooling circuit of the fuel cell unit.

6 Claims, 1 Drawing Sheet

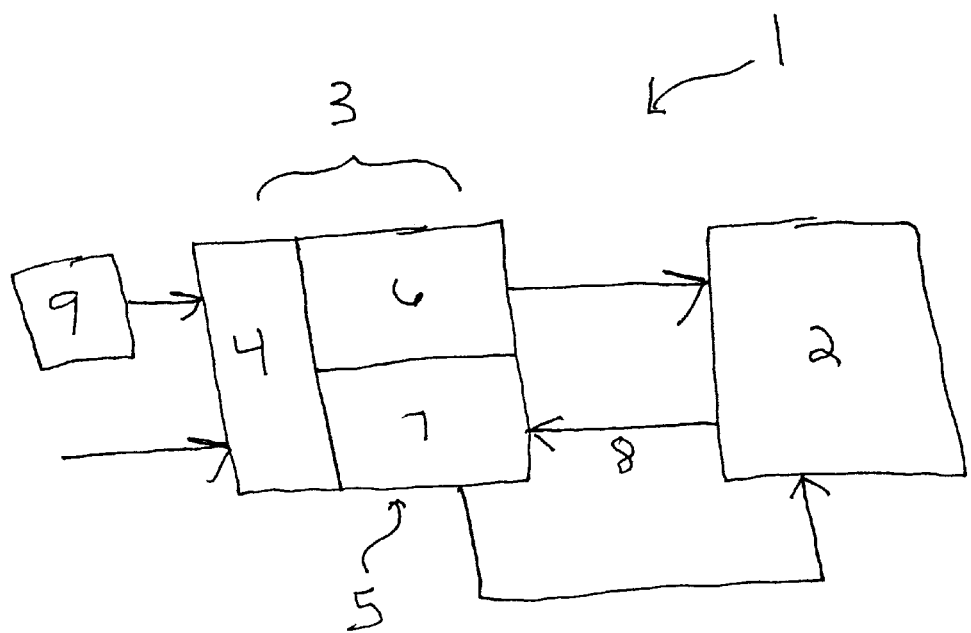
Figure

FUEL CELL SYSTEM HAVING AN EVAPORATOR

BACKGROUND AND SUMMARY OF INVENTION

This application claims the priority of German patent document 199 58 179.7, filed Dec. 2, 1999, the disclosure of which is expressly incorporated by reference herein.

The present invention relates to an evaporator for a polymer electrolyte membrane fuel cell system.

To evaporate media, for example water or fuel, in a polymer electrolyte membrane fuel cell system, evaporators which are heated with hot gas or another heat-transfer medium, such as heat-transfer oil, are known. Directly-heated evaporators are also known.

DE 197 20 294 discloses an evaporator for a fuel cell system in which a water/methanol mixture is evaporated at high temperatures as a result of the evaporator being heated by the heat released from a strongly exothermic reaction.

The present invention is based on the object of providing an evaporator for a polymer electrolyte membrane fuel cell system which makes it possible to utilize thermal energy in the polymer electrolyte membrane fuel cell system and which is suitable for use in a vehicle driven by a fuel cell.

According to the present invention, the evaporator is heated by the waste heat from the polymer electrolyte membrane fuel cell unit. It is preferable for the partial pressure of the medium which is to be evaporated to be reduced, so that the partial pressure is below the saturation vapor pressure at a given evaporator temperature.

As a result, the fuel cell waste heat in the cooling circuit can be utilized for the gas generation system of the fuel cell system, even though the polymer electrolyte membrane fuel cell unit is at a temperature level which in itself is not sufficient to be utilized for evaporation. As a result, the overall efficiency of the system can be increased. In addition, it is possible to relieve the load on a cooler provided in the cooling circuit.

In a further advantageous configuration, a fuel cell unit which allows an operating temperature that is higher than the boiling temperature of the medium to be evaporated is used.

The present invention is therefore particularly suitable for fuel cell systems which are used in vehicles.

BRIEF DESCRIPTION OF THE DRAWING

The sole FIGURE schematically shows a fuel cell system according to the present invention.

DETAILED DESCRIPTION OF THE DRAWING

A conventional fuel cell system 1 comprises a fuel cell unit 2 which is supplied with a hydrogen-rich medium by a gas generation unit 3. The gas generation unit 3 has a reformer 4 and an evaporator 5. The evaporator has at least one evaporation chamber 6 for evaporation of a medium and at least one heat-transfer chamber 7 in thermally communication with the at least one evaporation chamber. The evaporator evaporates a hydrogen-containing fluid and/or water, preferably methanol and/or a methanol/water mixture. A hydrogen-rich gas or gas mixture, which is fed to a fuel cell where it is used for energy generation, is generated in the reformer from the evaporated medium.

The conventional fuel cell comprises an anode and a cathode which are separated by a polymer electrolyte membrane. Preferably, a plurality of fuel cells are connected in series and/or in parallel to form a fuel cell unit in such a way that they provide an electric voltage level and power level which is sufficient to operate devices, in particular a vehicle.

The operating temperature of conventional fuel cells with polymer electrolyte membranes is below 100° C. Therefore, the fuel cell waste heat in the cooling circuit 8 of the fuel cell unit could not previously be used for the gas generation system for a hydrogen-rich gas from a fuel, this system usually including an evaporator.

However, an evaporator according to the present invention has means for heating the evaporator using the fuel cell waste heat.

In a preferred embodiment of the present invention, to evaporate a significant amount of the medium to be evaporated, it is preferable for the partial pressure of the medium to be lowered, so that the partial pressure is below the saturation vapor pressure at the current evaporator temperature. The evaporation rate of the medium rises.

This measure makes it possible to heat an evaporator even using a medium which is at a temperature which is lower than the boiling point of the medium under the prevailing environmental conditions.

Means 9 which allow the medium to be evaporated to be diluted are preferred. For example, the means may comprise a metering of air into the evaporator, so that the medium to be evaporated is diluted. This is particularly advantageous if a device for partial oxidation of CO is provided in the fuel cell system. It is also possible for dilution of this nature to be achieved by metering inert gas into the evaporator.

A further advantageous possibility consists in providing a metering of cathode off-gas from the fuel cell unit into the evaporator as means for reducing the partial pressure.

A further advantageous possibility for reducing the partial pressure of the medium to be evaporated consists in providing a recycling of the reformate into the evaporator.

A further advantageous possibility consists in providing means for reducing the total pressure in the evaporator. For example, at atmospheric pressure methanol evaporates at approximately 65° C., while at higher pressures, such as those which are customary in a fuel cell system, the boiling temperature is significantly higher.

In a further preferred embodiment of the invention, the fuel cell unit used has an operating temperature which is higher than the boiling temperature of the medium to be evaporated, preferably above 120° C.

Naturally, the preferred embodiments may also be combined.

In a fuel cell system, coolers for dissipating waste heat are exposed to considerable loads. An advantage of the invention is that the load on such coolers is relieved. This is particularly advantageous in vehicles. The efficiency of the overall system is increased.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fuel cell system, comprising:
   a polymer electrolyte membrane fuel cell having a cooling circuit; and
   an evaporator having at least one evaporation chamber for evaporation of a medium and at least one heat-transfer chamber in thermal communication with the at least one evaporation chamber; wherein, the heat-transfer chamber is an element of the cooling circuit; and the fuel cell system further comprises an air-metering device that reduces the partial pressure of the medium.

2. A fuel cell system, comprising:

a polymer electrolyte membrane fuel cell having a cooling circuit; and an evaporator having at least one evaporation chamber for evaporation of a medium and at least one heat-transfer chamber in thermal communication with the at least one evaporation chamber; wherein, the heat-transfer chamber is an element of the cooling circuit;

means are provided for reducing the partial pressure of the medium to below a saturation vapor pressure of the medium at a given temperature in the evaporator; and the means for reducing the partial pressure comprise a pipe for recycling a reformate into the evaporator.

3. A fuel cell system, comprising:

a polymer electrolyte membrane fuel cell having a cooling circuit; and an evaporator having at least one evaporation chamber for evaporation of a medium and at least one heat-transfer chamber in thermal communication with the at least one evaporation chamber; wherein, the heat-transfer chamber is an element of the cooling circuit; and the fuel cell system further comprises a pump that reduces the total pressure in the evaporator.

4. A process for evaporating a hydrogen-containing fluid in a fuel cell system, comprising:

feeding hydrogen gas to at least one fuel cell, thereby generating heat;

lowering a partial pressure of the medium to be evaporated in an evaporator to an extent that the partial pressure is below a saturation pressure of the medium in the evaporator; and heating the evaporator with the heat;

wherein said lowering comprises metering an into the evaporator.

5. A process for evaporating a hydrogen-containing fluid in a fuel cell system, comprising:

feeding hydrogen gas to at least one fuel cell, thereby generating heat;

lowering a partial pressure of the medium to be evaporated in an evaporator to an extent that the partial pressure is below a saturation pressure of the medium in the evaporator; and heating the evaporator with the heat;

wherein said lowering comprises recycling a reformate into the evaparator.

6. A method of operating a fuel cell system having a polymer electrolyte membrane fuel cell and an evaporator with at least one evaporation chamber for evaporation of a medium, which evaporation chamber is in thermal communication with at least one heat transfer chamber for heating said evaporation chambers, said method comprising;

heating said evaporation chamber with waste heat from the fuel cell by passing exhaust gas from said fuel cell through a cooling circuit that includes said heat transfer chamber as an element thereof; and reducing partial pressure of the medium in the evaporation chamber to below a saturation vapor pressure of the medium at a given temperature in the evaporator;

wherein said step of reducing partial pressure comprises at least one of:

metering air into said evaporator;
metering an inert gas into said evaporator;
metering cathode exhaust gas into said evaporator; and
recycling a reformate gas into the evaporator.

* * * * *